United States Patent
Han et al.

(10) Patent No.: US 9,045,842 B2
(45) Date of Patent: Jun. 2, 2015

(54) ELECTROCHEMICAL ETCHING APPARATUS

(75) Inventors: Shu-Jen Han, Cortlandt Manor, NY (US); Lian Guo, Croton-on-Hudson, NY (US); Xuesong Li, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/617,727

(22) Filed: Sep. 14, 2012

(65) Prior Publication Data

US 2014/0076721 A1    Mar. 20, 2014

(51) Int. Cl.
| | |
|---|---|
| C25F 7/00 | (2006.01) |
| C25F 5/00 | (2006.01) |
| B32B 38/10 | (2006.01) |
| C25F 3/02 | (2006.01) |
| C01B 31/04 | (2006.01) |

(52) U.S. Cl.
CPC . *C25F 7/00* (2013.01); *B32B 38/10* (2013.01); *C01B 31/0453* (2013.01); *C25F 3/02* (2013.01); *C25F 5/00* (2013.01)

(58) Field of Classification Search
None
See application file for complete search history.

(56) References Cited

U.S. PATENT DOCUMENTS

| | | | | |
|---|---|---|---|---|
| 6,998,175 | B2 * | 2/2006 | Murata et al. | 428/354 |
| 2002/0070126 | A1 * | 6/2002 | Sato et al. | 205/640 |
| 2010/0021708 | A1 | 1/2010 | Kong et al. | |
| 2011/0091647 | A1 | 4/2011 | Colombo et al. | |
| 2011/0227000 | A1 | 9/2011 | Ruoff et al. | |
| 2011/0303899 | A1 | 12/2011 | Padhi et al. | |
| 2011/0319554 | A1 | 12/2011 | Frazier et al. | |
| 2012/0088039 | A1 | 4/2012 | Yu et al. | |
| 2013/0220530 | A1 * | 8/2013 | Gong et al. | 156/247 |

OTHER PUBLICATIONS

Certified English translation of U.S. Appl. No. 61/602,739, Nov. 2012.*
X. Li et al., Large-Area Synthesis of High-Quality and Uniform Graphene Films on Copper Foils, Published Online May 7, 2009, Science, vol. 324, No. 5932, 2009, pp. 1312-1314.
A. Reina et al., •Few-Layer Graphene Films on Arbitrary Substrates by Chemical Vapor Deposition,• Nano Letters, vol. 9, No. 1, 2009, pp. 30-35.
Y. Wang et al., •Electrochemical Delamination of CVD-Grown Graphene Film: Toward the Recyclable Use of Copper Catalyst,• ACS Nano, vol. 5, No. 12, 2011, pp. 9927-9933.
C.-Y. Su et al., •High-Quality Thin Graphene Films from Fast Electrochemical Exfoliation,• ACS Nano, vol. 5, No. 3, 2011, pp. 2332-2339.

* cited by examiner

*Primary Examiner* — Harry D Wilkins, III
(74) *Attorney, Agent, or Firm* — Cantor Colburn LLP; Vazken Alexanian

(57) ABSTRACT

An electroplating etching apparatus includes a power to output current, and a container configured to contain an electrolyte. A cathode is coupled to the container and configured to fluidly communicate with the electrolyte. An anode is electrically connected to the output, and includes a graphene layer. A metal substrate layer is formed on the graphene layer, and is etched from the graphene layer in response to the current flowing through the anode.

15 Claims, 5 Drawing Sheets

ELECTROCHEMICAL ETCHING APPARATUS

GOVERNMENT RIGHTS

This invention was made with Government support under Contract No.: FA8650-08-C-7838 awarded by Defense Advanced Research Projects Agency (DARPA). The Government has certain rights in this invention.

BACKGROUND

The present disclosure generally relate to electroplating, and more specifically, to electrochemical etching of metal substrates.

The use of graphene in electronic devices and semiconductor applications has increased in recent years due to the desirable properties graphene offers. For example, graphene has remarkable electrical properties including impressively high current density, mobility and saturation velocity, and 2D geometry of graphene also makes it compatible to the conventional CMOS top-down process flow. Thus, it has become desirable to incorporate graphene into semiconductor devices.

A growing trend for producing graphene is the use of chemical vapor deposition (CVD) of hydrocarbons to synthesize graphene films on metal substrates, especially copper foils. Thereafter, the metal substrate may be removed and the graphene may be transferred to another dielectric substrate. The conventionally accepted means for removing the metal substrate from the graphene is to immerse the graphene/metal substrate in a chemical etchant to dissolve the metal. However, the dissolved metal by-product causes environmental pollution and increases production costs incurred from having to properly dispose of the metal by-product.

SUMMARY

According to an exemplary embodiment of the present disclosure, an electroplating etching apparatus comprises a power supply including a negative terminal and a positive terminal configured to output current, a container configured to contain an electrolyte, a cathode coupled to the container and configured to fluidly communicate with the electrolyte, the cathode having a portion electrically connected to the negative terminal of the power supply; and an anode having a portion electrically connected to the positive terminal of the power supply, the anode including a graphene layer and a metal substrate layer that is transferred to the cathode in response to the current flowing through the anode.

In another exemplary embodiment of the present disclosure, an anode configured to electrically communicate with an electrochemical etching apparatus. The anode comprises a graphene layer including a first surface and a second surface opposite the first surface, a metal substrate layer contacting the first surface and configured to electrically transfer from the graphene layer to a cathode in fluid communication with an electrolyte in response to a current flowing through the anode, an electrically conductive polymer formed on the second surface of the graphene layer, and a metal plate having a first portion in electrical communication with the electrically conductive polymer and a second portion in electrical communication with the positive terminal of a power supply to receive the current.

In yet another exemplary embodiment of the present disclosure, an electrochemical etching method comprises forming an anode having a graphene layer formed on a metal substrate layer, disposing the metal substrate layer in an electrolyte, disposing a cathode being electrically connected to the negative terminal of the power supply in the electrolyte, and connecting at least one of the graphene layer and the metal substrate layer to a power source to supply the current through the anode and the electrolyte such that the metal substrate layer is etched from the graphene layer and transferred to the cathode.

In still another exemplary embodiment according to the present disclosure, a method of forming an anode. The method comprises forming a graphene layer on an upper surface of a metal substrate layer, the metal substrate layer configured to fluidly communicate with an electrolyte, forming an electrically conductive polymer on a first surface of the graphene layer opposite the lower surface of the metal substrate layer, and forming a metal plate in electrical communication with the electrically conductive polymer, the metal plate configured to electrically communicate with the positive terminal of a power supply to receive the current such that the metal substrate layer is transferred to a cathode in fluid communication with the electrolyte via electrodeposition.

Additional features and utilities are realized through the techniques of the present disclosure. Other exemplary embodiments and features of the claimed disclosure are described in detail herein and are considered a part of the claimed disclosure. For a better understanding of the present disclosure and corresponding features, descriptions of the exemplary embodiments are presented below.

BRIEF DESCRIPTION OF THE SEVERAL VIEWS OF THE DRAWINGS

The subject matter which is regarded as the present disclosure is particularly pointed out and distinctly claimed in the claims at the conclusion of the specification. The forgoing and other features, and utilities of the present disclosure are apparent from the following detailed description taken in conjunction with the accompanying drawings in which:

DETAILED DESCRIPTION

Figure 1:
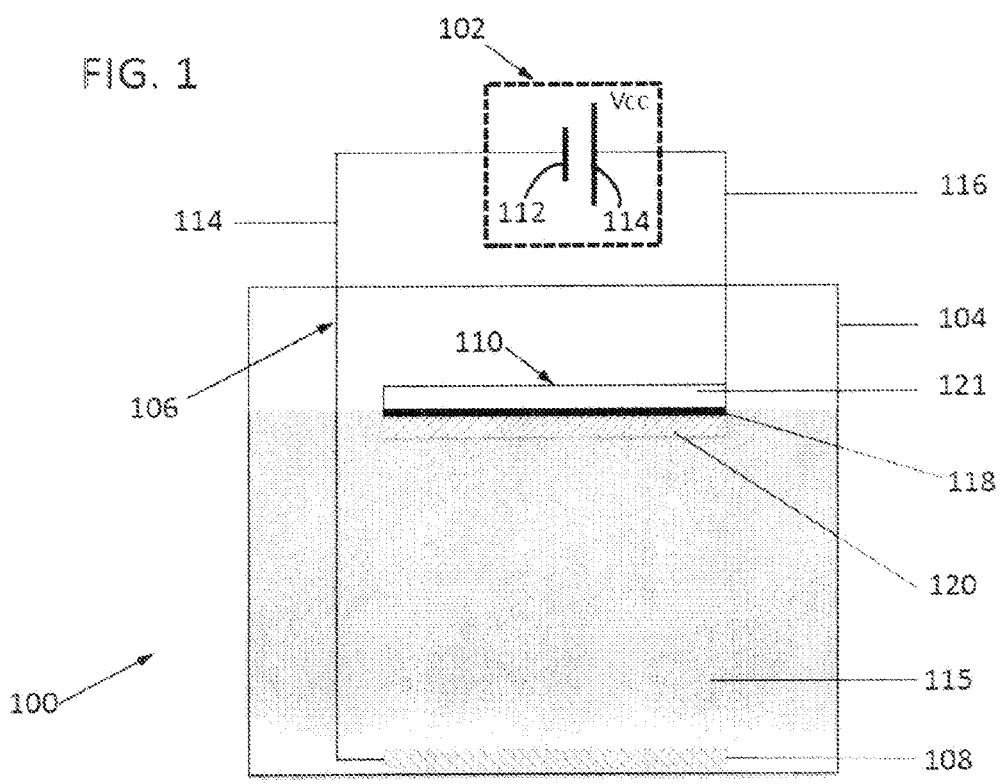
FIG. 1 illustrates an electrochemical etching apparatus according to an exemplary embodiment of the present disclosure.

Referring now to FIG. 1, an electroplating etching apparatus 100 according to an exemplary embodiment of the present disclosure is illustrated. The electroplating etching apparatus 100 includes a power supply 102, a container 104 and an electrical etching network 106. The electrical etching network 106 includes a cathode 108 and an anode 110, each in electrical communication with the power supply 102 as discussed in greater detail below.

The power supply 102 includes a negative terminal 112 and a positive terminal 114 that outputs a current. The current may be a direct current (DC), and may have a value selected to achieve a current density at the anode ranging from about 2 mA/cm² to about 200 mA/cm².

The container 104 may contain an electrolyte solution 115 capable of conducting a current that induces an electrochemical etching process to etch away a metal substrate formed on the anode 110. In addition, the metal substrate may be transferred from the anode 110 to a surface of a cathode 108 disposed in the electrolyte solution 115 via an electrodeposition process to effectively remove the metal substrate. The electrolyte solution 115 may comprise cupric ions and/or chlorine ions that render the electrolyte solution to be electrically conductive. According to at least one exemplary embodiment, the electrolyte solution 115 includes, but is not limited, to sulfuric acid ($H_2SO_4$), copper sulfate pentahydrate, 2N hydrochloric acid, sodium sulfate, etc. An electrolyte solution of sulfuric acid may range from 2-50 grams/liter (g/L), copper sulfate pentahydrate may range from 20-300 g/L, 2N hydrochloric acid may range from 0-5 milliliters/liters (ml/L), and sodium sulfate may range from 80-200 g/L. It can be appreciated that other solutions of acids, bases or salts may be used as the electrolyte solution 115. In addition, the electrolyte solution 115 may comprise either $H_2SO_4$ or chloride (Cl), and an electrolyte metal. The electrolyte metal may include, but is not limited to, copper and tin. Further, the electrolyte metal may be matched to a metal substrate layer of the anode 110. For example, if the metal substrate layer of the anode 108 is a copper substrate layer, the electrolyte solution 115 may be copper chloride ($CuCl_2$).

The electrical etching network 106 is in electrical communication with the power supply 102 and in fluid communication with the electrolyte solution 115. More specifically, in at least one exemplary embodiment illustrated in FIG. 1, the cathode 108 may be coupled to an inner surface of the container 104 and immersed in the electrolyte solution 115. An electrically conductive wire 114, for example, may have one end connected to the cathode 108 and an opposing end connected to the negative terminal 112 of the power supply 102. The cathode 108 may be formed of any metal configured to receive metal transferred from the anode 110 via an electro-etching process, i.e., through electrodeposition. In at least one exemplary embodiment, the cathode 108 is formed of copper (Cu). In another exemplary embodiment, the metal of the cathode 108 is matched to a metal substrate of the anode 110. For example, if the anode includes a copper metal substrate layer to be etched away, the cathode may be formed of copper.

The anode 110 is in electrical communication with the positive terminal 114 of the power supply 102 via a second electrically conductive wire 116. The anode 110 may include a graphene layer 118 formed on a metal substrate layer 120. In at least one exemplary embodiment the graphene layer 118 may be synthesized on the metal substrate layer 120 using a chemical vapor distribution (CVD) process. The wire 116 may be electrically connected to a portion of the metal substrate layer 120 and/or the graphene layer 118 using a polymer film 121, such as a polyethylene adhesive film. Further, the metal substrate layer 120 may be disposed in fluid communication with the electrolyte solution 115.

An electrochemical circuit may be effected when the cathode 108 and the anode 110 are introduced to the electrolyte solution 115 as described above. Accordingly, the current output from the power supply 102 travels through the anode 110 and to the electrolyte solution 115, which induces an electrochemical etching process such that the metal substrate layer 120 is etched away from the anode 110 and dissolved in the electrolyte solution 115. In another embodiment of the disclosure, the current output from the power supply 102 may induce an electroplating process such that a metal substrate layer 118 formed on the anode 110 is transferred to the cathode 108 via electrodeposition. As a result, the metal substrate layer 120 is removed, i.e., etched, from the anode 110, leaving only the graphene layer 118, which may later be transferred to another desired substrate, for example as silicon. While the metal substrate 120 layer is removed from the graphene layer 118 of the anode 110, a new metal substrate is formed on the cathode 108 and regenerated thereon. A new graphene layer may later be formed on the new metal substrate layer of the cathode 108 such that the metal substrate layer may be recycled. Further, the composition of the electrolyte solution 115 may be maintained, thereby providing an environmentally-friendly solution for disposing of the electrolyte solution.

Figure 2:
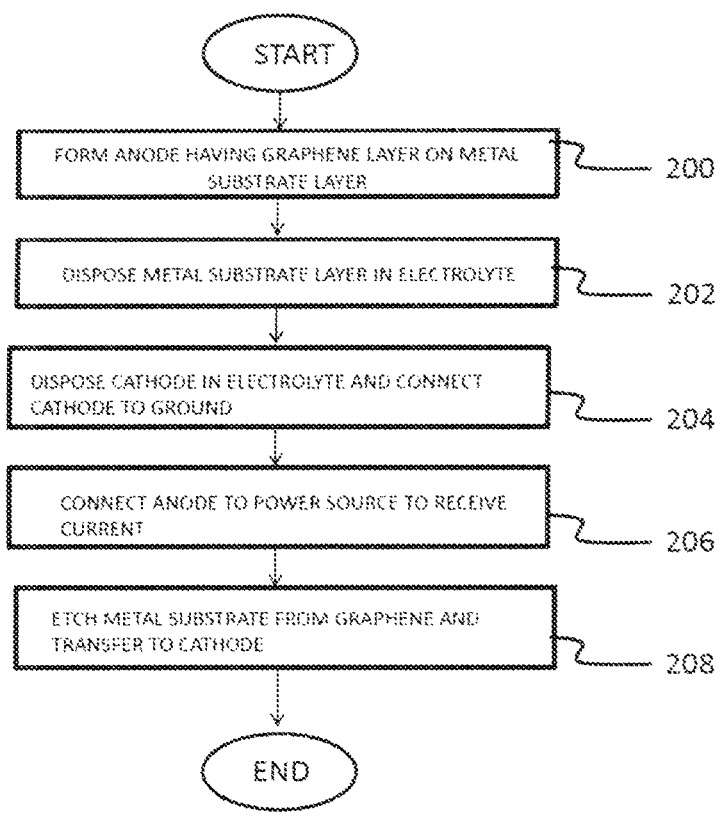
FIG. 2 is a flow diagram illustrating a method etching a metal substrate layer from a graphene layer according to at least one exemplary embodiment of the present disclosure.

Referring to FIG. 2, a flow diagram illustrates a method of etching a metal substrate layer from a graphene layer according to at least one exemplary embodiment of the present disclosure. The method begins at operation 200, where an anode is formed having a graphene layer formed on a metal substrate layer, such as copper In addition, a polymer film may be coated on graphene for mechanical support. At operation 202, the metal substrate layer is fluidly communicated with an electrolyte, such as a $H_2SO_4$ solution. A cathode in electrical communication with the negative terminal of the power supply is disposed in fluid communication with the electrolyte at operation 204. The anode is connected to a power source to received current at operation 206. In response to the current, the metal substrate layer is etched from the graphene layer and transferred to the cathode at operation 208, and the method ends. Alternatively, at least one embodiment of the disclosure provides a feature where the metal substrate layer may be etched from the graphene layer and dissolved in an electrolyte solution without being transferred to a cathode. Accordingly, a graphene layer is obtained, which may be transferred to another desired substrate without relying on a chemical etchant to dissolve the metal substrate layer.

Figure 3:
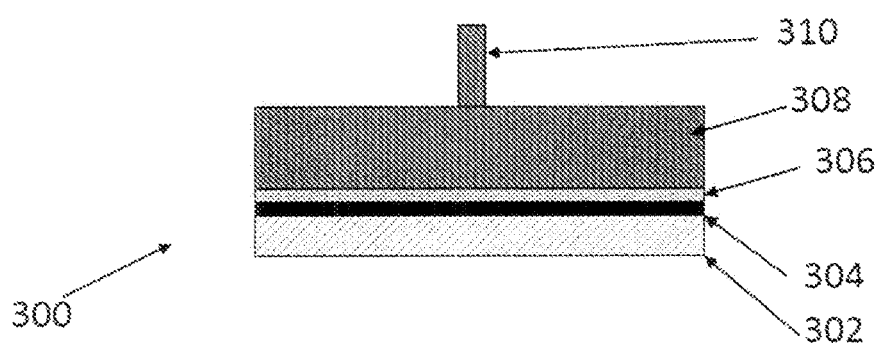
FIG. 3 illustrates an anode configured to electrically communicate with an electroplating etching apparatus according to an exemplary embodiment of the present disclosure.

Referring now to FIG. 3, an anode 300 configured to electrically communicate with an electroplating etching apparatus is illustrated according to at least one exemplary embodiment of the present disclosure. The anode 300 includes a metal substrate layer 302, a graphene layer 304, an electrically conductive polymer 306, and a metal plate 308.

The metal substrate layer 302 includes a first surface, such as a lower surface, and an opposing second surface, such as an upper surface. The metal substrate layer 302 is configured to fluidly communicate with an electrolyte solution. The metal substrate layer 302 may include, for example, a copper film layer. A graphene layer 304 may be formed on the upper surface of the metal substrate layer 302. As discussed in detail above, when current flows through the anode 300 during an electroplating process, the metal substrate layer 302 is transferred from the graphene layer 304 to a cathode in fluid communication with an electrolyte solution via electrodeposition. As a result, the metal substrate layer 302 is etched from the anode 300, thereby leaving only the graphene layer 304. Thereafter, the graphene layer 304 may be transferred to another desired substrate.

It can be appreciated that the anode 300 may be formed without the electrically conductive polymer 306 and metal plate 308. In this case, however, the rate at which the metal substrate layer 302 is etched is proportional, i.e., dependent on, the remaining thickness of the metal substrate layer 302 since the current flows from the edge of the metal substrate layer 302 and graphene layer 304. More specifically, as the metal substrate layer 302 is etched and its thickness diminishes, the current density realized by the graphene layer 304 increases and may become too large, thus damaging the graphene layer 304. To prevent damage, the current output from a power supply is kept low such that the current density does not reach a level that damages the graphene layer 304. However, the low current throughput may cause a residual amount of metal substrate layer 302 to remain on the graphene layer 304.

For example, in a case where a copper film 302 having a thickness of 100 micrometers (μm) is used as the metal substrate layer 302, a low current output from a power source needs be selected such that a current density is kept at an accepted level. Accordingly, the graphene layer 304 is not damaged as the copper film 302 is etched away. However, since the current is low, a residual amount of copper film 302 may remain on the graphene layer 304. As a result, the electroetching procedure is prolonged to ensure the copper film layer 302 is completely removed.

To overcome the dependency of the current flow on the size of the metal substrate layer 302, at least one exemplary embodiment of the present disclosure provides the electrically conductive polymer 306 and metal plate 308. The electrically conductive polymer 306 may couple the graphene layer 304 to the metal plate 308. More specifically, the electrically conductive polymer 306 is formed on a second surface of the graphene layer 304 opposite the metal substrate layer 302. In at least one exemplary embodiment, the electrically conductive polymer 306 includes, but is not limited to, Poly(3,4-ethylenedioxythiophene) poly(styrenesulfonate) (PEDOT:PSS).

At least one portion of the metal plate 308, such as a lower surface, is coupled to the electrically conductive polymer 306. The metal plate 308 may be formed of a metal including, but not limited to, gold, copper, silver and tin. Further, the surface area of the metal plate 308 may be matched to have the same surface area of the metal substrate layer 302 and/or the graphene layer 304. A second portion of the metal plate 308, such as an upper surface, is in electrical communication with an output of a power supply to receive an electrical current. For example, an electrically conductive wire 310 having a first end may be connected to the upper surface of the metal plate 308, and an opposite end may be connected to the output of the power supply. Accordingly, current from the power supply may be delivered to the anode 300 and through the metal plate 308, the graphene layer 304 and the metal substrate layer 302 to an electrolyte solution. As a result, an electroetching process takes occurs, which etches the metal substrate layer 302 away from the graphene layer.

Therefore, since the first end of the wire 310 is connected to the metal plate 308, the current flows through the full surface of the graphene layer 304 and the metal substrate layer 302, and a significantly higher current may be delivered through metal substrate layer 302 without damaging the graphene layer 304. Accordingly, at least one exemplary embodiment of the present disclosure provides an electroplating apparatus where the etching time is independent from the remaining thickness of metal substrate layer 302, and the overall etching time may be reduced.

Turning again to the case of the 100 μm thick copper film 302 discussed above, since current flows through the full surface of the copper film 302 instead of flowing from the edge of the copper film 302, a substantially higher current can be applied while keep the same current density without damaging the graphene layer 304. In one embodiment, for example, the current density may be kept at 2 mA/cm$^2$. Accordingly, at least one exemplary embodiment illustrated in FIG. 3 provides an anode 300 including a graphene layer 304 electrically coupled to a metal plate 308 configured to receive current and maintain a sustainably increased current throughput through the copper film 302. Therefore, the overall etching time of the copper film 302 may be reduced, and large scale productions of graphene may be achieved.

Figure 4:
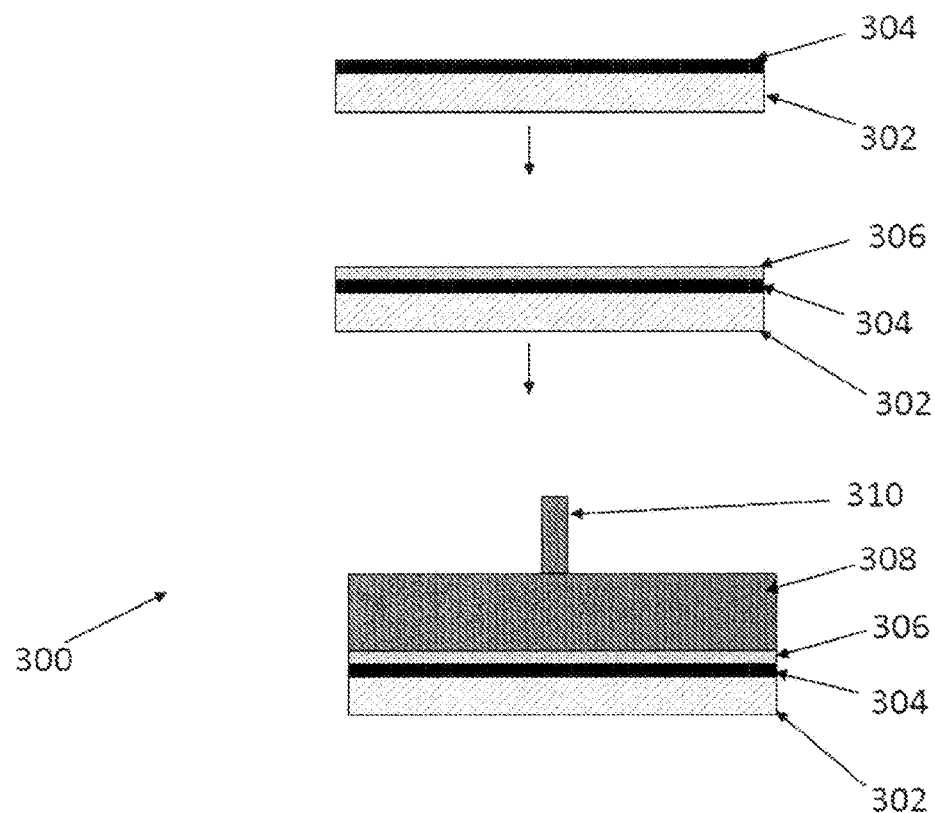
FIG. 4 is a process flow illustrating formation of the anode illustrated in FIG. 3.
Figure 5:
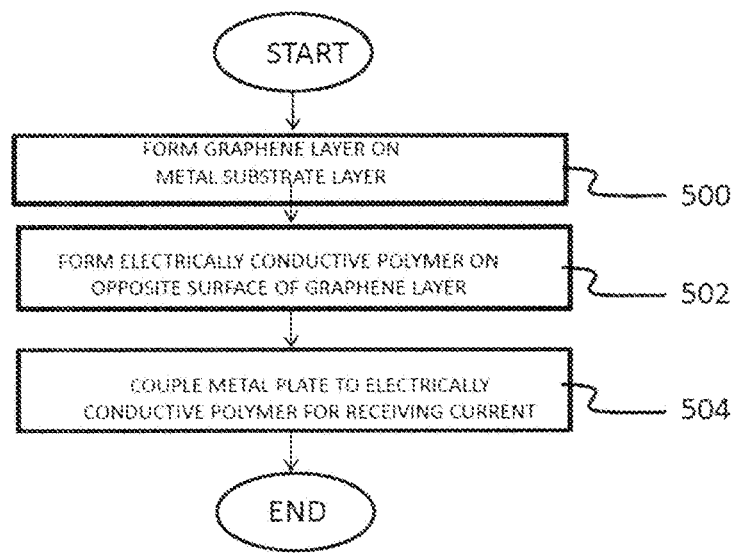
FIG. 5 is a flow diagram illustrating a method of forming an anode illustrated in FIGS. 3-4 according to at least one exemplary embodiment of the present disclosure.

A method of forming an anode used by an electroplating etching apparatus according to at least one exemplary embodiment of the present disclosure may be realized with reference to FIGS. 4 and 5. More specifically, FIG. 4 is a process flow illustrating formation of the anode 300 illustrated in FIG. 3, and FIG. 5 is a flow diagram illustrating a method of forming an anode 300 configured for application with an electroplating etching apparatus according to at least one exemplary embodiment of the present disclosure. At operation 500, a graphene layer 304 is formed on a metal substrate layer 302, such as a copper film. The graphene layer 304 may be formed using various processes including, but not limited to, chemical vapor deposition (CVD). An electrically conductive polymer 306 is formed on a surface of the graphene layer 304 opposite the surface contacting the metal substrate layer 302 at operation 502. At operation 504, a metal plate 308 is coupled to the electrically conductive polymer 306. Accordingly, the electrically conductive polymer 306 and the graphene layer 304 are disposed between the metal substrate layer 302 and the metal plate 308, and the method ends.

The terminology used herein is for the purpose of describing exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the present disclosure. For instance, the operations may be performed in a differing order or steps may be added, deleted or modified. All of these variations are considered a part of the claimed embodiments.

While exemplary embodiments of the present disclosure have been described, it will be understood that those skilled in the art, both now and in the future, may make variations to the embodiments which fall within the scope of the following claims. These claims should be construed to maintain the proper protection of the embodiments of the disclosure described herein.

What is claimed is:

1. An electrochemical etching apparatus, comprising:
   a power supply including a negative terminal and a positive terminal configured to output current;
   a container configured to contain an electrolyte;
   a cathode coupled to the container and configured to fluidly communicate with the electrolyte, the cathode having a portion electrically connected to the negative terminal; and
   an anode having a portion electrically connected to the positive terminal, the anode including a graphene layer and a metal substrate layer that is etched from the graphene layer in response to the current flowing through the anode, the anode further including a metal plate having a first portion in electrical communication with the positive terminal to receive the current; and an electrically conductive polymer comprising Poly(3,4-ethylenedioxythiophene):poly(styrenesulfonate) (PEDOT:PSS) configured to couple the metal plate to the graphene layer.

2. The electrochemical etching apparatus of claim 1, wherein a first surface of the graphene layer is disposed on an upper surface of the metal substrate layer, and the metal substrate layer is configured to fluidly communicate with the electrolyte.

3. The electrochemical etching apparatus of claim 2, wherein the anode further comprises a metal plate having a first portion in electrical communication with the output of the power supply to receive the current.

4. The electroplating etching apparatus of claim 1, wherein the current density at the anode ranges from 2-200 mA/cm$^2$.

5. The electrochemical etching apparatus of claim 4, wherein the metal substrate layer comprises copper (Cu).

6. The electrochemical etching apparatus of claim 1, wherein the electrolyte is a solution of sulfuric acid ($H_2SO_4$).

7. The electrochemical etching apparatus of claim 1, wherein the electrolyte is a solution comprising chloride (Cl) and an electrolyte metal.

8. The electrochemical etching apparatus of claim 7, wherein the electrolyte metal is matched to the metal substrate layer of the anode.

9. The electrochemical etching apparatus of claim 8, wherein the cathode comprises a metal configured to receive the metal substrate layer of the anode, the metal substrate transferred from the graphene layer to the cathode via electrodeposition in response to current flowing through the anode.

10. The electrochemical etching apparatus of claim 9, wherein the metal is matched to the metal substrate layer of the anode.

11. An anode configured to electrically communicate with an electrochemical etching apparatus, the anode comprising:
a graphene layer including a first surface and a second surface opposite the first surface;
a metal substrate layer contacting the first surface and configured to electrically transfer from the graphene layer to a cathode in fluid communication with an electrolyte in response to a current flowing through the anode;
an electrically conductive polymer comprising Poly(3,4-ethylenedioxythiophene):poly(styrenesulfonate) (PEDOT:PSS), the electrically conductive polymer formed on the second surface of the graphene layer; and
a metal plate having a first portion in electrical communication with the electrically conductive polymer and a second portion in electrical communication with an output of a power supply to receive the current.

12. The anode of claim 11, wherein the first surface of the graphene layer is disposed on an upper surface of the metal substrate layer, and the metal substrate layer is configured to fluidly communicate with the electrolyte.

13. The anode of claim 12, wherein a size of the metal plate is matched to a size of at least one of the graphene layer and the metal substrate layer.

14. The anode of claim 11 further comprising a wire coupled to the metal plate and configured to electrically communicate with the output of the power supply to receive the current.

15. The anode of claim 11, wherein the metal plate is formed of a metal comprising at least one of gold, copper, silver and tin.

* * * * *